United States Patent
Shimada et al.

(10) Patent No.: US 9,438,153 B2
(45) Date of Patent: Sep. 6, 2016

(54) ROTARY ELECTRIC MACHINE CONTROL DEVICE

(71) Applicant: AISIN AW CO., LTD., Anjo-shi, Aichi-ken (JP)

(72) Inventors: Arinori Shimada, Anjo (JP); Tatsuya Okubo, Anjo (JP); Subrata Saha, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/761,884

(22) PCT Filed: Mar. 28, 2014

(86) PCT No.: PCT/JP2014/059144
§ 371 (c)(1),
(2) Date: Jul. 17, 2015

(87) PCT Pub. No.: WO2014/157628
PCT Pub. Date: Oct. 2, 2014

(65) Prior Publication Data
US 2015/0357956 A1    Dec. 10, 2015

(30) Foreign Application Priority Data
Mar. 28, 2013 (JP) .................................. 2013-069330

(51) Int. Cl.
*H02P 21/00* (2016.01)
*H02P 6/18* (2016.01)

(52) U.S. Cl.
CPC .............. *H02P 6/181* (2013.01); *H02P 6/182* (2013.01); *H02P 6/183* (2013.01); *H02P 21/18* (2016.02)

(58) Field of Classification Search
CPC ............................... H02P 6/181; H02P 21/18
USPC ........................................................ 318/400.02
See application file for complete search history.

(56) References Cited

U.S. PATENT DOCUMENTS

| | | | | |
|---|---|---|---|---|
| 6,163,127 | A * | 12/2000 | Patel ................... | B60L 11/1803 318/700 |
| 2011/0089876 | A1* | 4/2011 | Patel ..................... | B60L 3/0038 318/400.33 |
| 2013/0049656 | A1* | 2/2013 | Yasui ...................... | H02P 21/00 318/400.02 |

FOREIGN PATENT DOCUMENTS

| | | |
|---|---|---|
| JP | H10-94298 A | 4/1998 |
| JP | 2008-220100 A | 9/2008 |
| JP | 2010-004699 A | 1/2010 |
| JP | 2010-124566 A | 6/2010 |

OTHER PUBLICATIONS

Jun. 10, 2014 International Search Report issued in Application No. PCT/JP2014/059144.

* cited by examiner

*Primary Examiner* — Erick Glass
(74) *Attorney, Agent, or Firm* — Oliff PLC (57) ABSTRACT

A rotary electric machine control device that controls a rotary electric machine that includes a rotor in which a permanent magnet is disposed so as to provide magnetic saliency, and that performs feedback control on the rotary electric machine on the basis of a deviation between a current command and a feedback current from the rotary electric machine in a d-q-axis vector coordinate system defined by a d-axis which extends in a direction of a magnetic field produced by the permanent magnet and a q-axis which is orthogonal to the d-axis.

16 Claims, 4 Drawing Sheets

ROTARY ELECTRIC MACHINE CONTROL DEVICE

BACKGROUND

The present disclosure relates to a rotary electric machine control device that performs vector control on a rotary electric machine.

A control method called vector control is known as a control method for a permanent-magnet synchronous rotary electric machine, e.g. a three-phase synchronous motor. In the vector control, motor currents that flow through stator coils of the motor for three phases are subjected to a coordinate conversion into vector components for two phases, namely a d-axis, which extends in the direction of a magnetic field generated by a permanent magnet disposed in a rotor, and a q-axis, which is orthogonal to the d-axis, to perform feedback control. For the coordinate conversion, it is necessary to accurately detect the position of the rotor (magnetic pole position). In many cases, a rotation sensor such as a resolver is utilized to detect the magnetic pole position. For the purpose of cost reduction, however, sensorless magnetic pole detection in which the magnetic pole position is electrically detected on the basis of an electrical phenomenon that matches the magnetic pole position without using such a rotation sensor is occasionally performed. For example, an induced electromotive force produced by rotation of the rotor can be utilized to electrically detect the magnetic pole position. Because an induced electromotive force is not produced or only a small induced electromotive force is produced in the case where the rotor is stationary or in the case where the rotor is rotating at a very low speed, however, the magnetic pole position may not be detected accurately by the method. Thus, there is also proposed a method in which a high-frequency current or a high-frequency voltage is applied to a motor and the magnetic pole position is estimated in accordance with a response from the motor.

When it is attempted to decide the magnetic pole position (or the phase of a rotating d-q-axis coordinate system) by one of the method which utilizes an induced electromotive force and the method which applies a high frequency, that is, a single method, the accuracy is reduced in a high speed rotation range (a region in which the rotation frequency is high) or a low speed rotation range (a region in which the rotation frequency is low). Japanese Patent Application Publication No. H10-94298 (JP H10-94298 A) proposes a technology that addresses such an issue about sensorless magnetic pole detection. According to JP H10-94298 A, two phase decision methods, namely a phase decision method for a low frequency region and a phase decision method for a high frequency region, are used to generate phases, and the two phases are weight-averaged with respect to the frequency to obtain the phase of a d-q-axis coordinate system.

By applying the technology according to JP H10-94298 A, the phase is decided on the basis of a method that is suitable for the rotation frequency, among the two methods, by weight-averaging the two phases with respect to the frequency to switch between the two phase decision methods at a certain ratio in accordance with the rotation frequency. In both the method used in the low frequency region (e.g. the method in which a high-frequency current or a high-frequency voltage is applied to the motor) and the method used in the high frequency region (e.g. the method which utilizes an induced electromotive force), however, the estimation accuracy in estimating the magnetic pole position tends to be varied in accordance with torque of the motor. Thus, a sufficient accuracy in deciding the phase (estimating the magnetic pole position) may not be secured only by switching the phase decision method and deciding the weight for weight averaging on the basis of the rotation frequency.

SUMMARY

In view of the foregoing background, it is desirable to provide a technology for accurately estimating the magnetic pole position irrespective of the operating state of a rotary electric machine.

In view of the foregoing issue, according to an exemplary embodiment, the present disclosure provides a rotary electric machine control device that controls a rotary electric machine that includes a rotor in which a permanent magnet is disposed so as to provide magnetic saliency, and that performs feedback control on the rotary electric machine on the basis of a deviation between a current command and a feedback current from the rotary electric machine in a d-q-axis vector coordinate system defined by a d-axis which extends in a direction of a magnetic field produced by the permanent magnet and a q-axis which is orthogonal to the d-axis, the rotary electric machine control device includes an electronic control unit that is structured to: compute a magnetic pole position of the rotor on the basis of an induced voltage generated in the rotary electric machine; apply a high-frequency observation signal to the rotary electric machine, and compute the magnetic pole position of the rotor on the basis of a high-frequency component included in the feedback current as a component as a response to the observation signal; and switch a computation mode for computing the magnetic pole position of the rotor between at least two modes that include a high speed range computation mode in which the magnetic pole position is computed and a low speed range computation mode in which the magnetic pole position is computed, wherein the electronic control unit sets a high speed rotation range prescribed by a rotational speed and torque of the rotary electric machine and a low speed rotation range prescribed by the rotational speed and the torque of the rotary electric machine and prescribed on a side on which the rotational speed is lower than that in the high speed rotation range, applies the high speed range computation mode in the high speed rotation range, applies the low speed range computation mode in the low speed rotation range, and sets both a high speed range-side boundary and a low speed range-side boundary so as to be on a side on which the rotational speed is low in the case where the torque is relatively high compared to a case where the torque is relatively low, the high speed range-side boundary being a boundary between a region on a side on which the rotational speed is lower than that in the high speed rotation range and the high speed rotation range, and the low speed range-side boundary being a boundary between a region on a side on which the rotational speed is higher than that in the low speed rotation range and the low speed rotation range.

According to the characteristic configuration, the rotary electric machine control device includes the high speed range-position computation section and the low speed range-position computation section (which is an example of part of an electronic control unit), and can estimate the magnetic pole position in a rotational speed range that suits each of the computation sections. Further, the switching section (which is also an example of part of an electronic control unit) switches the computation mode between at least two modes for computing the magnetic pole position, which makes it possible to accurately estimate the magnetic pole position over a wide rotational speed range. In the switching section, the low speed rotation range and the high speed rotation range are set, and such rotation ranges are not only set simply in correspondence with the rotational speed, but also set in correspondence with the torque. In the case where the rotary electric machine is controlled so as to maximize output torque (in the case where maximum torque control is performed), for example, when the high speed range-position computation section estimates the magnetic pole position, an induced voltage for estimating the magnetic pole position is also increased, which improves the estimation accuracy. That is, when the high speed range-position computation section estimates the magnetic pole position, the estimation accuracy is improved in the case of high torque compared to the case of low torque.

When the low speed range-position computation section estimates the magnetic pole position, on the other hand, computation is stabilized in the case of low torque compared to the case of high torque for the following reasons. In order to express the saturation characteristics, a dynamic inductance is occasionally defined as the inductance of the rotor. In the case where maximum torque control is performed, for example, when the torque becomes larger, the q-axis current is increased so that q-axis magnetic flux gradually approaches a saturated region. The dynamic inductance is represented by a differential. Therefore, when the q-axis current is increased to approach a saturated region, the dynamic inductance approximates "0". That is, as the torque becomes larger, the q-axis dynamic inductance becomes smaller. The salient pole ratio is indicated by a value obtained by dividing the q-axis dynamic inductance by the d-axis dynamic inductance. When the q-axis dynamic inductance becomes smaller, the salient pole ratio becomes lower, which reduces the stability in estimating the magnetic pole position utilizing the saliency. That is, when the low speed range-position computation section estimates the magnetic pole position, the estimation accuracy is improved in the case of low torque compared to the case of high torque even at the same rotational speed.

In the switching section, as discussed above, the low speed rotation range and the high speed rotation range are set, and such rotation ranges are not only set simply in correspondence with the rotational speed, but also set in correspondence with the torque. Specifically, both the high speed range-side boundary and the low speed range-side boundary are set on a side on which the rotational speed is low in the case where the torque is relatively high compared to a case where the torque is relatively low. Thus, estimation of the magnetic pole position by the high speed range-position computation section is executed with a region in which the rotational speed is high and the torque is high defined as the application region, and estimation of the magnetic pole position by the low speed range-position computation section is executed with a region in which the rotational speed is low and the torque is low defined as the application region. As a result, the switching section sets a region in which each of the two computation sections can stably estimate the magnetic pole position as the application region of the computation section, which enables the magnetic pole position to be estimated with high accuracy. Thus, according to the characteristic configuration, the magnetic pole position can be accurately estimated irrespective of the operating state of the rotary electric machine.

The induced voltage generated in the rotary electric machine is mainly generated in a stator because of rotation of the rotor. Thus, in the rotary electric machine control device according to an exemplary aspect of the present disclosure, the electronic control unit preferably computes the magnetic pole position of the rotor at least on the basis of an induced voltage generated in the stator by rotation of the rotor.

In order to enhance the estimation accuracy for the magnetic pole position in the high speed range computation mode, in addition, it is desirable that an induced voltage generated in the rotary electric machine should be specified appropriately. Thus, in one exemplary aspect, preferably, the electronic control unit computes the magnetic pole position of the rotor using an extended induced voltage model that uses an extended induced voltage calculated from an induced voltage generated by rotation of magnetic flux generated in the rotor by a d-axis current, an induced voltage generated by variations in current that flows through a q-axis inductance on the stator side, and an induced voltage generated by rotation of magnetic flux of the permanent magnet. According to the configuration, the magnetic pole position can be estimated further accurately compared to the magnetic pole position computed using a common induced voltage model.

As discussed above, the switching section switches the computation mode so as to apply the high speed range computation mode in the high speed rotation range and apply the low speed range computation mode in the low speed rotation range. If the boundary between the high speed rotation range and the low speed rotation range is fixed, the computation mode may be switched frequently when the rotational speed is varied around the boundary, which may cause hunting in the estimation result of the magnetic pole position. Thus, a hysteresis is preferably set for the boundary. In the rotary electric machine control device according to one exemplary aspect of the present disclosure, preferably, the electronic control unit computes a rotational speed of the rotor; a hysteresis that is larger than an error in the rotational speed produced by an error in the magnetic pole position computed in the high speed range computation mode is set for the high speed range-side boundary; and a hysteresis that is larger than an error in the rotational speed produced by an error in the magnetic pole position computed in the low speed range computation mode is set for the low speed range-side boundary.

When switching is made from a computation mode in which the magnetic pole position is not estimated by the low speed range-position computation section to a computation mode in which the magnetic pole position is estimated by the low speed range-position computation section, there is a time lag in which a high-frequency observation signal is applied to the rotary electric machine and a response component is subjected to signal processing. Thus, by making preparations by applying an observation signal before actually estimating the magnetic pole position, it is possible to suppress a loss of an estimated magnetic pole position when such switching is made. In the rotary electric machine control device according to one exemplary aspect of the present disclosure, preferably, a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

DETAILED DESCRIPTION OF THE EMBODIMENTS

Figure 1:
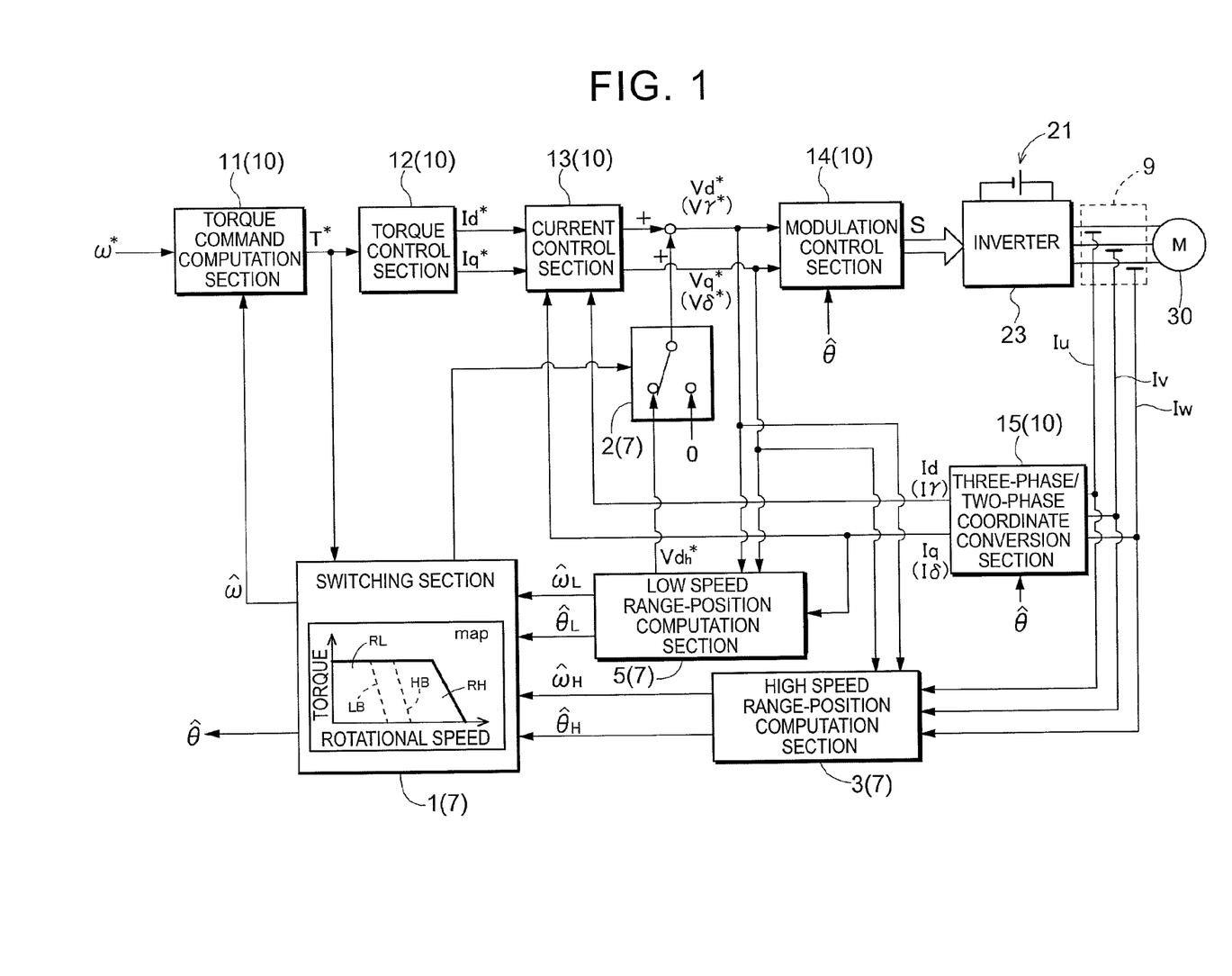
FIG. 1 is a block diagram schematically illustrating an example of the configuration of a rotary electric machine control device.

An embodiment of the present disclosure will be described below with reference to the drawings. As illustrated in FIG. 1, a rotary electric machine control device is a control device provided with a function of detecting the rotational state (the magnetic pole position and the rotational speed) of an AC rotary electric machine 30 in a so-called sensorless manner without using a rotation sensor such as a resolver. In the embodiment, the rotary electric machine 30 is an interior permanent magnet synchronous motor (IPMSM), and has saliency (including inverse saliency), that is, the magnetic properties in the direction of the N pole of a permanent magnet of a rotor are different from the magnetic properties in a direction that is electrically perpendicular thereto (direction that is shifted in electrical angle by 90° therefrom). In the embodiment, as discussed in detail later, a motor control device utilizes the saliency to determine the rotational state such as the magnetic pole position, the magnetic pole direction, and the rotational speed in a sensorless manner even when the rotary electric machine 30 is stationary or rotating at a low speed. Thus, the present disclosure can be applied to other types of rotary electric machine having saliency, e.g. synchronous reluctance motors. As a matter of course, the rotary electric machine 30 includes a motor (electric motor), a generator (electric generator), and a motor generator that functions both as a motor and as a generator as necessary.

As illustrated in FIG. 1, the rotary electric machine control device includes an inverter control section 10 and a rotational state information computation section 7. The inverter control section 10 and the rotational state information computation section 7 are each constituted as an ECU (electronic control unit) constructed by a logic circuit such as a microcomputer as its core member. The inverter control section 10 controls drive of the rotary electric machine 30 via an inverter 23 through current feedback control using a vector control method. The inverter control section 10 and the rotational state information computation section 7 are each composed of a variety of functional sections, which are each implemented through cooperation between hardware such as a microcomputer and software (program).

A DC power source 21 connected to the inverter 23 is a rechargeable secondary battery such as a battery. The inverter 23 is subjected to switching control performed in accordance with a switching control signal S provided from the inverter control section 10 to convert power between DC and AC. For example, the inverter 23 converts DC power from the DC power source 21 into three-phase AC power to supply the three-phase AC power to the rotary electric machine 30. When the rotary electric machine 30 functions as a generator, meanwhile, the inverter 23 converts generated AC power into DC power to supply the DC power to the DC power source 21.

The inverter 23 includes a plurality of switching elements. The switching elements are preferably IGBTs (insulated gate bipolar transistors), MOSFETs (metal oxide semiconductor field effect transistors), or the like. In place of such Si (silicon) devices, the switching elements are also preferably SiC (silicon carbide) devices such as SiC-MOSFETs and SiC-SITs (static induction transistors). The inverter 23 which converts power between DC power and multi-phase AC power (herein, three-phase AC power) is constituted of a bridge circuit having a number of arms, the number corresponding to the number of the phases (herein, three), as well known. That is, two switching elements are connected in series between the DC positive side (positive power source line) and the DC negative side (negative power source line) of the inverter 23 to compose one arm. Here, the switching element connected to the positive power source line is referred to as "upper switching element", and the switching element connected to the negative power source line is referred to as "lower switching element".

In the case where the multi-phase AC power is three-phase AC power, three series circuits (each corresponding to one arm) are connected in parallel. That is, a bridge circuit in which a set of series circuits (arms) corresponds to each of stator coils of the rotary electric machine 30 corresponding to U-phase, V-phase, and W-phase is constituted. The middle point between the series circuits (arms) formed by a pair of switching elements for each phase, that is, the point of connection between the upper switching element and the lower switching element, is connected to each of the stator coils of the rotary electric machine 30. A free-wheel diode (regeneration diode) is connected in parallel to each of the switching elements.

The inverter 23 is connected to the inverter control section 10 via a driver circuit (not illustrated), and performs switching operation in accordance with the switching control signal S generated by the inverter control section 10. The driver circuit is a circuit that includes a voltage conversion circuit, an insulation circuit, and so forth, and that relays the switching control signal S generated by the inverter control section 10 to a control terminal (such as a gate terminal or a base terminal) of the switching element. For example, in the case where the rotary electric machine 30 is a drive force source for a vehicle or the like, the DC power source 21 provides a high voltage, and the switching elements of the inverter 23 switch a high voltage. Thus, the potential difference between a high level and a low level of a pulsed drive signal (control signal) input to a control terminal of an element that switches a high voltage is a voltage that is much higher than the operating voltage of a common electronic circuit such as a microcomputer. Thus, the control signal is input to the switching elements of the inverter 23 after being subjected to a voltage conversion and an insulation via the driver circuit.

Thus, the rotary electric machine 30 is driven at predetermined output torque and rotational speed via the inverter 23 which is subjected to switching control performed by the inverter control section 10. In this event, the value of a current that flows through each stator coil of the rotary electric machine 30 is fed back to the inverter control section 10. The inverter control section 10 executes PI control (proportional-integral control) or PID control (proportional-integral-differential control) on the deviation from a current command (Id*, Iq*) to control drive of the rotary electric machine 30. In order to achieve such feedback control, a current (Iu, Iv, Iw) that flows through a conductor such as a bus bar provided between an arm of the inverter 23 for each phase and a stator coil of the rotary electric machine 30 for each phase is detected by a current sensor 9. In FIG. 1, the current sensor 9 is illustrated in the form of a non-contact current sensor that detects an AC current that flows through an AC power line such as a bus bar in a non-contact manner. In the embodiment, the current sensor 9 is disposed for all of the three phases. Because the currents for the three phases are balanced so that the instantaneous value of the sum of the currents for the three phases is zero, however, it is also possible to detect currents for only two phases and obtain a current for the remaining phase through computation.

Now, vector control performed by the inverter control section 10 will be described briefly. In such vector control, the vector space (coordinate system) is a d-q-axis vector coordinate system (d-q-axis vector space) defined by a d-axis, which extends in the direction of a magnetic field generated by a permanent magnet disposed in the rotor of the rotary electric machine 30, and a q-axis, which is electrically orthogonal to the d-axis. In the embodiment, the inverter control section 10 includes a torque command computation section 11, a torque control section 12 (current command computation section), a current control section 13 (voltage command computation section), a modulation control section 14, and a three-phase/two-phase coordinate conversion section 15.

In the embodiment, the torque command computation section 11 computes a torque command T* (target torque) on the basis of a speed command ω* from an upstream ECU (not illustrated) and the actual rotational speed. In the embodiment, rotation of the rotary electric machine 30 is detected in a sensorless manner without using a rotation sensor such as a resolver. Thus, the actual rotational speed is an estimated rotational speed estimated by the rotational state information computation section 7, and indicated by ω with ^ (hat) as illustrated in FIG. 1 (indicated as "ω^" in the specification for convenience). The torque control section 12 sets current commands Id*, Iq* for vector control in accordance with the torque command T*. The current commands Id*, Iq* are set in correspondence with the d-q-axis vector coordinate system discussed above.

The current control section 13 performs PI control, for example, on the deviation between the current commands Id*, Iq* in the d-q-axis vector coordinate system and feedback currents Id, Iq to compute voltage commands Vd*, Vq* in the d-q-axis vector coordinate system. The feedback currents Id, Iq are the detected values of three-phase currents that flow through the stator coils of the rotary electric machine 30 which are subjected to a coordinate conversion performed by the three-phase/two-phase coordinate conversion section 15 into a d-q-axis vector coordinate system with two phases and fed back. The voltage commands Vd*, Vq* are subjected to a coordinate conversion performed by the modulation control section 14 into voltage commands for three phases. The modulation control section 14 generates the switching control signal S for switching control of the inverter 23 on the basis of the voltage commands for three phases through PWM (pulse width modulation), for example.

The coordinate conversions performed by the modulation control section 14 and the three-phase/two-phase coordinate conversion section 15 are performed on the basis of a magnetic pole position θ of the rotor. That is, in order to perform vector control on the rotary electric machine 30, it is necessary to perform a coordinate conversion between the real three-phase space and the two-phase d-q-axis vector coordinate system. Therefore, it is necessary to accurately detect the magnetic pole position θ of the rotor. The embodiment adopts sensorless control in which the magnetic pole position θ of the rotor is estimated with no rotation detection device such as a resolver provided. Thus, the magnetic pole position θ is an estimated magnetic pole position, and indicated by θ with ^ as illustrated in FIG. 1 (indicated as θ^ in the specification for convenience).

While the rotary electric machine 30 is rotating, a pulsating component due to an induced electromotive force is included in the feedback currents Id, Iq. Therefore, a rotational speed ω (estimated rotational speed ω^) can be computed by detecting the pulsating component, and the magnetic pole position θ (estimated magnetic pole position θ^) can be computed from the estimated rotational speed θ^. When the rotary electric machine 30 is stationary, on the other hand, no induced electromotive force is produced as a matter of course. When the rotary electric machine 30 is rotating at a low speed, meanwhile, a small induced electromotive force is produced, and a small pulsating component is included in the feedback currents Id, Iq. Therefore, it is necessary to use another method in order to compute the rotational speed ω (ω^) and the magnetic pole position θ (θ^). For example, in the case where the rotary electric machine 30 is stationary or rotating at a low speed, a high-frequency observation signal (observation current or observation voltage) that serves as an electrical stimulus is applied to the rotary electric machine 30, and the rotational speed ω (ω^) and the magnetic pole position θ (θ^) can be computed from a response from the rotary electric machine 30.

In the embodiment, as illustrated in FIG. 1, two position computation sections, namely a high speed range-position computation section 3 and a low speed range-position computation section 5, are provided. The high speed range-position computation section 3 mainly computes a rotational speed ω (ω^$_H$) and a magnetic pole position θ (θ^$_H$) in a high speed rotation range in which an induced electromotive force (induced voltage) can be utilized. The low speed range-position computation section 5 mainly computes a rotational speed ω (ω^$_L$) and a magnetic pole position θ (θ^$_L$) in a low speed rotation range using a high-frequency observation signal. The result (ω^$_H$ and θ^$_H$) of computation by the high speed range-position computation section 3 and the result (ω^$_L$ and θ^$_L$) of computation by the low speed range-position computation section 5 are selected or synthesized by the switching section 1 as discussed later to be utilized by the torque command computation section 11, the modulation control section 14, and the three-phase/two-phase coordinate conversion section 15. In addition, the control device 1 also controls a switch 2 so as to switch whether or not to apply a high-frequency observation signal (here, "Vd$_h$*").

Figure 2:
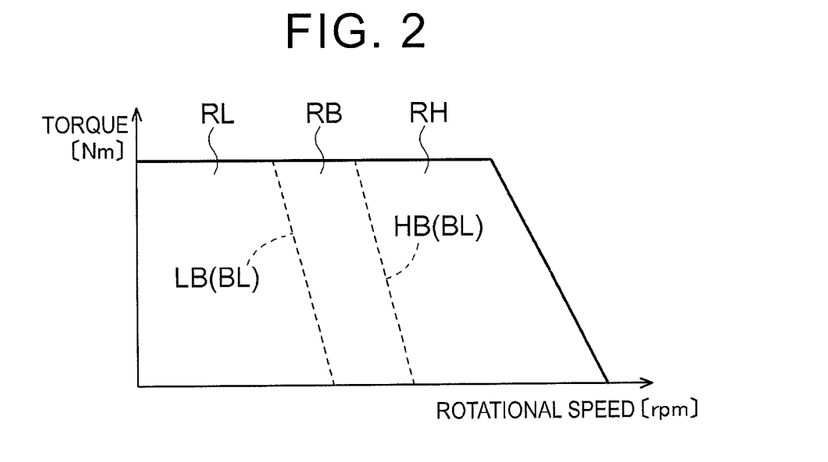
FIG. 2 illustrates an example of a rotation characteristic map prescribed by a rotational speed and torque.
Figure 3:
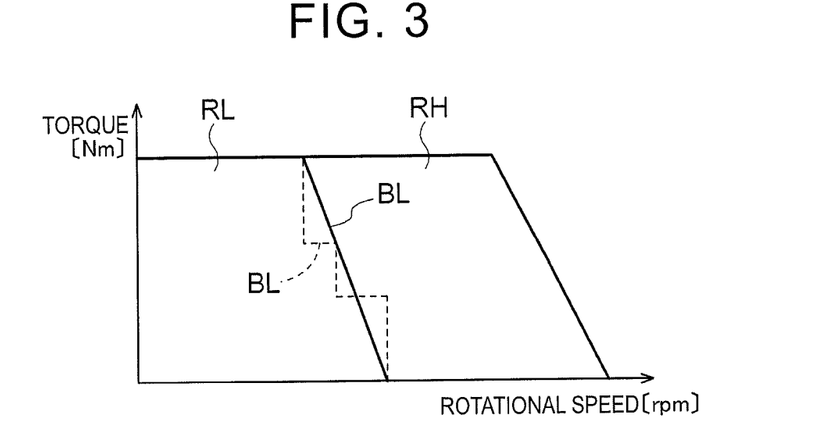
FIG. 3 illustrates an example of the rotation characteristic map prescribed by the rotational speed and the torque.
Figure 4:
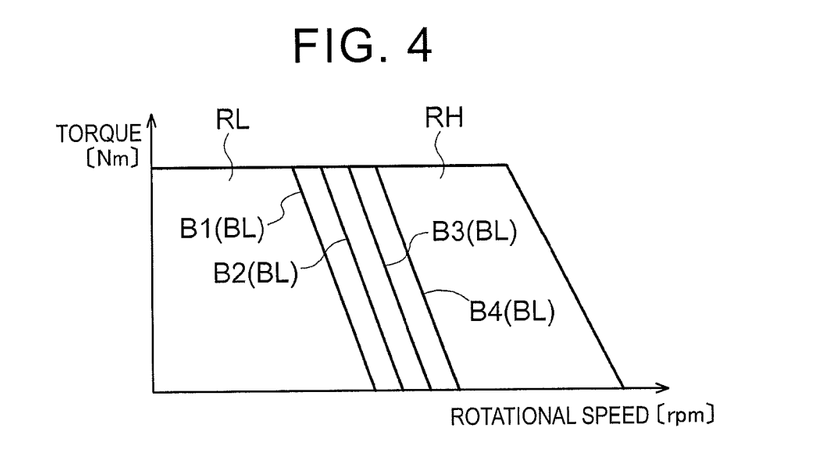
FIG. 4 illustrates an example of the rotation characteristic map prescribed by the rotational speed and the torque.

FIGS. 2 to 4 schematically illustrate a rotation characteristic map prescribed by the rotational speed [rpm] and the torque [Nm] of the rotary electric machine 30. In the drawings, "RL" indicates a low speed rotation range, and "RH" indicates a high speed rotation range. "RB" indicates a boundary region between the low speed rotation range RL and the high speed rotation range RH. "BL" indicates the boundary between the low speed rotation range RL and a higher speed rotation range, and the boundary between the high speed rotation range RH and a lower speed rotation range. In the case where such boundaries are to be differentiated, the boundary between the region that is higher in rotational speed than the low speed rotation range RL and the low speed rotation range RL is referred to as "low speed range-side boundary LB". Meanwhile, the boundary between the region that is lower in rotational speed than the high speed rotation range RH and the high speed rotation range RH is referred to as "high speed range-side boundary HB".

A hysteresis may be provided to the boundary BL so that no hunting is produced in the values of the rotational speed ω (ω^) and the magnetic pole position θ (θ^) during switching by the switching section 1. For example, preferably, switching is made to computation by the high speed range-position computation section 3 at the boundary BL on the high speed side (high speed range-side boundary HB) in the case where the rotational speed [rpm] is varied from a low speed to a high speed in FIG. 1, and switching is made to computation by the low speed range-position computation section 5 at the boundary BL on the low speed side (low speed range-side boundary LB) in the case where the rotational speed [rpm] is varied from a high speed to a low speed. In this event, the region interposed between the two boundaries BL (LB, HB) may be referred to as "boundary region RB". In one aspect, preferably, a hysteresis that is larger than an error in the rotational speed ω (ω^$_H$) computed in a high speed range computation mode by the high speed range-position computation section 3 is set for the high speed range-side boundary HB, and a hysteresis that is larger than an error in the rotational speed ω (ω^$_L$) computed in a low speed range computation mode by the low speed range-position computation section 5 is set for the low speed range-side boundary LB. In the case where only two boundaries BL, namely the low speed range-side boundary LB and the high speed range-side boundary HB, are set as in the example of FIG. 2, the gap in the horizontal axis direction (rotational speed) between the low speed range-side boundary LB and the high speed range-side boundary HB is preferably set to be larger than an error between the rotational speeds ω (ω^$_L$, ω^$_H$) computed by the position computation sections (3, 5).

In the low speed range computation mode by the low speed range-position computation section 5, as discussed above, it is necessary to apply a high-frequency observation signal (observation current or observation voltage) that serves as an electrical stimulus to the rotary electric machine 30, and to compute the rotational speed ω (ω^) and the magnetic pole position θ (θ^) from a response from the rotary electric machine 30. That is, a period for waiting for a response from the rotary electric machine 30 is required. Thus, it is necessary to start application of a high-frequency observation signal (observation current or observation voltage) to the rotary electric machine 30 before the low speed range computation mode is started. That is, a preparation period is required before the low speed range computation mode is started, and a preparation region is set as a rotation range. The preparation region is set adjacent to the low speed range-side boundary LB on the high rotational speed side. The preparation region is preferably set as a high-frequency application region in which an observation signal is applied to the rotary electric machine 30 while executing a computation mode applied in a region on the side on which the rotational speed is higher than that in the low speed rotation range RL. For example, in the case where the rotational speed is varied from a high speed to a low speed, the boundary region RB discussed above can be utilized as the high-frequency application region as the preparation region.

In the above description, a hysteresis is provided to the boundary BL. In the case where hunting produced in the values of the rotational speed ω (ω^) and the magnetic pole position θ (θ^) practically poses no problem, however, no hysteresis may be provided as a matter of course. FIG. 3 illustrates a boundary BL for which no hysteresis is set. The boundary BL is not necessarily a continuous line or curve, and may be stepped as indicated by the broken line in FIG. 3.

Besides the low speed range computation mode by the low speed range-position computation section 5 and the high speed range computation mode by the high speed range-position computation section 3, a boundary computation mode may be executed using the low speed range-position computation section 5 and the high speed range-position computation section 3, for example. That is, the low speed range computation mode may be executed in the low speed rotation range RL illustrated in FIG. 2, the high speed range computation mode may be executed in the high speed rotation range RH, and the boundary computation mode may be executed in the boundary region RB. In one aspect, in the boundary computation mode, the rotational speed ω (ω^) and the magnetic pole position θ (θ^) are preferably calculated in accordance with a weighted average of the result (ω^$_L$ and θ^$_L$) of computation by the low speed range-position computation section 5 and the result (ω^$_H$ and θ^$_H$) of computation by the high speed range-position computation section 3 calculated in accordance with the rotational speed.

In this case, a preparation period for starting computation by the low speed range-position computation section 5 is preferably provided before transition from the high speed range computation mode to the boundary computation mode. That is, a preparation region is preferably provided adjacent to the boundary between a rotation range in which computation by the low speed range-position computation section 5 is executed and the side higher in speed than the rotation range, on the high rotational speed side. As discussed above, the preparation region is set as a high-frequency application region in which an observation signal is applied to the rotary electric machine 30 while executing a computation mode (e.g. the high speed range computation mode) applied in a region on the side on which the rotational speed is higher than that in the rotation range in which computation by the low speed range-position computation section 5 is executed.

In this case, further, a hysteresis may be set for the boundary BL for transition from the low speed range computation mode or the high speed range computation mode to the boundary computation mode and the boundary BL for transition from the boundary computation mode to the low speed range computation mode or the high speed range computation mode. For example, a first boundary BL1, a second boundary BL2, a third boundary BL3, and a fourth boundary BL4 are set as illustrated in FIG. 4. In the case where the rotational speed becomes higher, transition from the low speed range computation mode to the boundary computation mode is started at the second boundary BL2, and transition from the boundary computation mode to the high speed range computation mode is made at the fourth boundary BL4. That is, in the case where the rotational speed becomes higher, a region in which the rotational speed is less than the second boundary BL2 is the low speed rotation range (RL) in which the low speed range computation mode is executed, a region in which the rotational speed is equal to or more than the second boundary BL2 and less than the fourth boundary BL4 is the boundary region (RB) in which the boundary computation mode is executed, and a region in which the rotational speed is equal to or more than the fourth boundary BL4 is the high speed rotation range (RH) in which the high speed range computation mode is executed.

In the case where the rotational speed becomes lower, transition from the high speed range computation mode to the boundary computation mode is started at the third boundary BL3, and transition from the boundary computation mode to the low speed range computation mode is made at the first boundary BL1. That is, in the case where the rotational speed becomes lower, a region in which the rotational speed is equal to or more than the third boundary BL3 is the high speed rotation range (RH) in which the high speed range computation mode is executed, a region in which the rotational speed is equal to or more than the first boundary BL1 and less than the third boundary BL3 is the boundary region (RB) in which the boundary computation mode is executed, and a region in which the rotational speed is less than the first boundary BL1 is the low speed rotation range (RL) in which the low speed range computation mode is executed.

A variety of forms of switching between the computation modes for computing rotational state information (estimated rotational speed ω^ and estimated magnetic pole position θ^) have been described above with reference to FIGS. 2 to 4. The rotational state information computation section 7 includes at least two position computation sections, namely the low speed range-position computation section 5 and the high speed range-position computation section 3. In addition, the rotational state information computation section 7 executes at least two modes, namely the high speed range computation mode in which at least the magnetic pole position θ (θ^) is computed by the high speed range-position computation section 3 and the low speed range computation mode in which at least the magnetic pole position θ (θ^) is computed by the low speed range-position computation section 5. The switching section 1 switches the computation mode between the at least two modes.

While the boundary BL is set for the switching as discussed above, the boundary BL is set so as to be on the side on which the rotational speed is low in the case where the torque is relatively high compared to a case where the torque is relatively low in the rotation characteristic map prescribed by the rotational speed [rpm] and the torque [Nm] of the rotary electric machine 30. That is, the switching section 1 sets the high speed rotation range RH prescribed by the rotational speed and the torque of the rotary electric machine 30 and the low speed rotation range RL prescribed on the side on which the rotational speed is lower than that in the high speed rotation range RH, and applies the high speed range computation mode in the high speed rotation range RH and applies the low speed range computation mode in the low speed rotation range RL. In addition, the switching section 1 sets both the high speed range-side boundary HB, which is the boundary between a region on the side on which the rotational speed is lower than that in the high speed rotation range RH and the high speed rotation range RH, and the low speed range-side boundary LB, which is the boundary between a region on the side on which the rotational speed is higher than that in the low speed rotation range RL and the low speed rotation range RL, so as to be on the side on which the rotational speed is low in the case where the torque is relatively high compared to a case where the torque is relatively low. As a matter of course, the boundary BL is not necessarily a continuous line or curve as in FIGS. 2 and 4, and may be stepped as indicated by the broken line in FIG. 3.

The method of computing the rotational state information by the high speed range-position computation section 3 and the low speed range-position computation section 5 will be described below. The high speed range-position computation section 3 computes the magnetic pole position θ (θ^) of the rotor on the basis of an induced voltage generated in the rotary electric machine 30. The induced voltage generated in the rotary electric machine 30 is mainly generated in a stator because of rotation of the rotor. Thus, the high speed range-position computation section 3 preferably computes the magnetic pole position θ (θ^) of the rotor at least on the basis of an induced voltage generated in the stator by rotation of the rotor of the rotary electric machine 30. Examples of such a computation method include a computation method based on a common induced voltage model (model that uses the expression (1) below). In the embodiment, in order to further increase the estimation accuracy for the magnetic pole position, the high speed range-position computation section 3 computes the magnetic pole position θ (θ^) of the rotor using an "extended induced voltage model" that uses an extended induced voltage obtained by summing an induced voltage generated by rotation of magnetic flux generated in the rotor by a d-axis current, an induced voltage generated by variations in current that flows through the q-axis inductance on the stator side, and an induced voltage generated by rotation of magnetic flux of the permanent magnet. A common circuit equation in the rotating coordinate system (d-q-axis vector coordinate system) of a rotary electric machine having magnetic saliency is represented by the following expression (1). In the expression, p indicates a differential operator, Ld and Lq indicate the d-axis inductance and the q-axis inductance, respectively, and $K_E$ indicates an induced voltage constant.

[Expression 1]

$$\begin{bmatrix} Vd \\ Vq \end{bmatrix} = \begin{bmatrix} R+pLd & -\omega Lq \\ \omega Ld & R+pLq \end{bmatrix} \begin{bmatrix} Id \\ Iq \end{bmatrix} + \begin{bmatrix} 0 \\ \omega K_E \end{bmatrix} \quad (1)$$

In sensorless control in which rotational state information is computed on the basis of the model which uses the expression (1) (a common induced voltage model), the estimation accuracy may be reduced depending on the specifications of the rotary electric machine, which results in insufficient versatility. The technical background of such control is described in detail in a paper by Shinji Ichikawa et al. "Sensorless Controls of Salient-Pole Permanent Magnet Synchronous Motors Using Extended Electromotive Force Models" (T.IEE Japan, vol. No. 12, 2002), and is not described in detail herein. According to the paper, the position information included in the expression (1) can be considered as the difference between the d-axis and the q-axis. That is, the position information is included in the difference in inductance between a diagonal component and an inverse diagonal component of the matrix in the first term on the right side of the expression (1) and the induced voltage term in the second term on the right side. When such pieces of the position information are integrated with each other, the expression (1) can be rewritten into the following expression (2). The symbol "·" added to "Iq" signifies a time differential of "Iq", and is used differently from the differential operator p in the expression (1) so that differentiation is only applied to a dotted variable.

[Expression 2]

$$\begin{bmatrix} Vd \\ Vq \end{bmatrix} = \begin{bmatrix} R+pLd & -\omega Lq \\ \omega Lq & R+pLd \end{bmatrix} \begin{bmatrix} Id \\ Iq \end{bmatrix} + \begin{bmatrix} 0 \\ (Ld-L)(\omega Id - \dot{I}q) + \omega K_E \end{bmatrix} \quad (2)$$

The voltage equation indicated by the expression (2) is referred to as "extended induced voltage model", and the second term of the expression (2) is defined as "extended induced voltage" as indicated by the following expression (3).

[Expression 3]

$$\begin{bmatrix} Ed \\ Eq \end{bmatrix} = \{(Ld-Lq)(\omega Id - \dot{I}q) + \omega K_E\} \begin{bmatrix} 0 \\ 1 \end{bmatrix} \quad (3)$$

The first term "(Ld−Lq)ωId" on the right side of the expression (3) indicates the induced voltage generated by rotation of magnetic flux generated in the rotor by a d-axis current. The second term "(Ld−Lq)ωIq" on the right side of the expression (3) indicates the induced voltage generated by variations in current that flows through the q-axis inductance on the stator side. The third term "ωK$_E$" on the right side of the expression (3) indicates the induced voltage generated by rotation of magnetic flux of the permanent magnet attached to the rotor. That is, position information in the permanent magnet of the rotary electric machine and the inductance is all aggregated in the "extended induced voltage". Although a detailed description is found in the paper by Ichikawa et al. and thus not presented herein, when the expression (2) is converted into a fixed coordinate system (e.g. α-β-axis vector coordinate system) set to the stator of the rotary electric machine, there is no term that includes a value (according to the paper, "2θ") that is difficult to process in estimating the magnetic pole position, which makes computation for estimation easy. In computing the magnetic pole position using a common induced voltage model, it is necessary to use approximation, which may reduce the estimation accuracy. In the case where an extended induced voltage model is used, however, approximation is not required, which makes it possible to accurately estimate the magnetic pole position θ (θ^) and the rotational speed ω (ω^).

Figure 5:
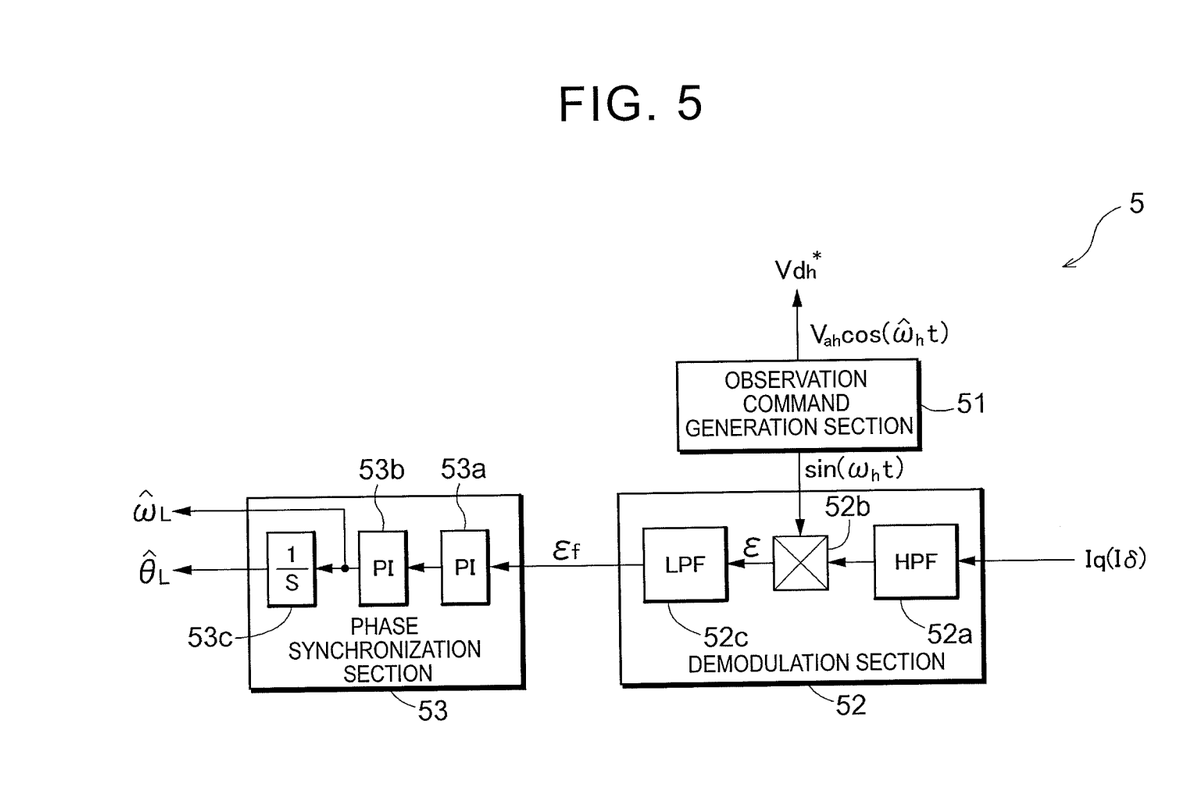
FIG. 5 is a block diagram schematically illustrating an example of the configuration of a low speed range-position computation section.

The low speed range-position computation section 5 applies a high-frequency observation signal to the rotary electric machine 30, and computes the magnetic pole position θ (θ^) of the rotor on the basis of a high-frequency component fed back as included in a feedback current as a component as a response to the observation signal. As illustrated in FIG. 5, for example, the low speed range-position computation section 5 includes an observation command generation section 51, a demodulation section 52, and a phase synchronization section 53. The observation command generation section 51 is a functional section that generates a high-frequency observation signal to be applied to the rotary electric machine 30. In the embodiment, a high-frequency observation signal (Vd$_h$*: V$_{ah}$ cos(ω^$_h$t)) to be superimposed on a d-axis voltage command Vd is generated.

Figure 6:
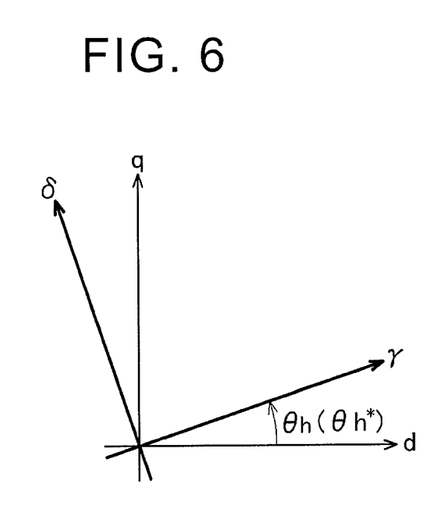
FIG. 6 illustrates the relationship between a d-q-axis vector coordinate system and a δ-γ-axis vector coordinate system.

A γ-δ-axis vector coordinate system corresponds to the observation signal. As illustrated in FIG. 6, a phase difference of "θ$_h$" (as a command value, a phase command "θ$_h$*") is present between the d-q-axis vector coordinate system and the γ-δ-axis vector coordinate system. A component as a response to the phase difference superimposed on a voltage command as a command value is included in the feedback current from the rotary electric machine 30.

Figure 7:
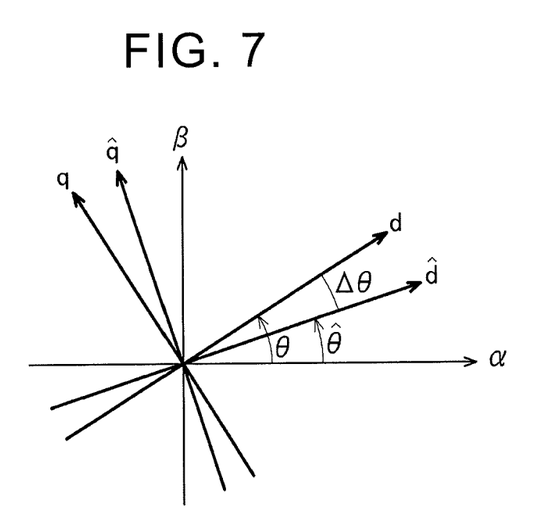
FIG. 7 illustrates the relationship between a α-β-axis vector coordinate system and the d-q-axis vector coordinate system.

When the relationship between the fixed coordinate system (α-β-axis vector coordinate system) set to the stator of the rotary electric machine 30 and the d-q-axis vector coordinate system is considered, the d-q-axis vector coordinate system rotates with respect to the α-β-axis vector coordinate system, and the magnetic pole position θ can be defined as a phase angle "θ" based on the α- and β-axes as illustrated in FIG. 7. In addition, the rotational speed ω of the rotor can be defined as the rotational speed ω of the d-q-axis vector coordinate system with respect to the α-β-axis vector coordinate system. In the case where the magnetic pole position θ is estimated through computation as in the embodiment, the actual d-q-axis vector coordinate system may not be directly detected. Thus, as indicated by the d- and q-axes with ^ (hat) in FIG. 7, an estimated d-q-axis vector coordinate system based on the magnetic pole position θ^ estimated through computation is set. The magnetic pole position of the rotor based on the α- and β-axes is defined as "θ^" with ^ as illustrated in FIG. 7, and the rotational speed of the estimated d-q-axis vector coordinate system with respect to the α-β-axis vector coordinate system is defined as "ω^" with ^.

As illustrated in FIG. 7, the estimated d-q-axis vector coordinate system is caused to coincide with the actual d-q-axis vector coordinate system by bringing Δθ, which corresponds to an error between the actual d-q-axis vector coordinate system and the estimated d-q-axis vector coordinate system, to zero. That is, the estimated d- and q-axes are caused match the actual d- and q-axes by bringing Δθ to zero, and thus the magnetic pole position is detected accurately. The rotational state information computation section 7 computes the magnetic pole position using the principle.

In the embodiment, as illustrated in FIG. 5, a q-axis feedback current Iq (δ-axis feedback current Iδ) is demodulated into "εf" by the demodulation section 52. The demodulation section 52 includes a high-pass filter 52a, a mixer 52b that serves as a core component of a heterodyne circuit, and a low-pass filter 52c. A component as a response to a high-frequency observation signal is extracted from the q-axis feedback current Iq (δ-axis feedback current Iδ) when the current passes through the high-pass filter 52a.

The inductance of the rotor for expressing the saturation characteristics includes a dynamic inductance defined by the following expression (4) and a static inductance defined by the following expression (5) for flux linkage Φ (Φd, Φq). In the expressions, Ld$_h$ indicates the d-axis dynamic inductance, Lq$_h$ indicates the q-axis dynamic inductance, Ld$_s$ indicates the d-axis static inductance, and Lq$_s$ indicates the q-axis static inductance.

[Expression 4]

$$Ld_h = \frac{\partial \Phi d}{\partial Id}, Lq_h = \frac{\partial \Phi q}{\partial Iq} \quad (4)$$

[Expression 5]

$$Ld_s = \frac{\Phi d}{Id}, Lq_s = \frac{\Phi q}{Iq} \quad (5)$$

The salient pole ratio, which indicates the magnetic saliency of the rotary electric machine 30, is indicated by "$Lq_h/Ld_h$", which is a value obtained by dividing the q-axis dynamic inductance by the d-axis dynamic inductance. In order to estimate the magnetic pole position, the salient pole ratio must be higher than "1". If the average value "ΣL" of the d-axis and q-axis dynamic inductances is defined as "$(Ld_h+Lq_h)/2$" and the difference "ΔL" between the d-axis and q-axis dynamic inductances is defined as "$(Ld_h-Lq_h)/2$", a high-frequency component "$Iδ_h$" of the δ-axis feedback current Iδ after passing through the high-pass filter 52a is indicated by the following expression (6).

[Expression 6]

$$I\delta_h = \left(\frac{-\Delta L}{\sum L^2 - \Delta L^2}\right)\sin(2\Delta\theta)\left(\frac{V_{ah}}{\omega_h}\sin\omega_h t\right) \quad (6)$$

Next, the response component "$Iδ_h$" extracted by the high-pass filter 52a and a sinusoidal component "$\sin(\omega_h t)$" of the high-frequency component of the observation command transferred from the observation command generation section 51 are mixed with each other by the mixer 52b to result in "ε" indicated by the following expression (7). "A" and "B" are each a constant. After "ε" passes through the low-pass filter 52c, "$ε_f$" indicated by the following expression (8) is obtained.

[Expression 7]

$$\varepsilon = A \cdot \cos(2\omega_h t) + B \cdot \sin(2\Delta\theta) \quad (7)$$

[Expression 8]

$$\varepsilon_f \approx \frac{V_{ah}}{2\omega_h}\left(\frac{-\Delta L}{Ld_h Lq_h}\right)\Delta\theta \quad (8)$$

As is clear also from FIG. 7, when "Δθ" in the expression (8) approximates "0", the error between the estimated d-q-axis vector coordinate system and the d-q-axis vector coordinate system is reduced. Thus, PI control is executed by the phase synchronization section 53 (PLL: phase locked loop) such that "Δθ" becomes "zero". In the embodiment, two PI control sections, namely a first PI control section 53a and a second PI control section 53b, are provided. An estimated rotational speed "$\hat{\omega}_L$" is calculated as a result of the PI control. A distance, that is, an angle, is obtained by integrating a rotational speed (angular speed). Thus, an estimated magnetic pole position "$\hat{\theta}_L$" is calculated by integrating the estimated rotational speed "$\hat{\omega}_L$" using an integrator 53c.

As described above, rotational state information is computed by each of the low speed range-position computation section 5 and the high speed range-position computation section 3. The switching section 1 switches the computation mode on the basis of the rotation characteristic map (see FIGS. 2 to 4 etc.) prescribed by the rotational speed and the torque of the rotary electric machine 30, and decides the estimated rotational speed "$\hat{\omega}$" and the estimated magnetic pole position "$\hat{\theta}$". The rotational speed as the criterion for the switching section 1 to determine switching of the computation mode may be the command value "ω*", or may be the estimated rotational speed "$\hat{\omega}$". Alternatively, the rotational speed as the criterion may be a value obtained by applying to the command value "ω*" a filter that takes into account a delay in the control system. The torque as the criterion for the switching section 1 to determine switching of the computation mode is not limited to the torque command T*, and may be a value calculated through computation from the d-axis feedback current Id (γ-axis feedback current Iγ) or the q-axis feedback current Iq (δ-axis feedback current Iδ). Alternatively, the torque as the criterion may be a value obtained by applying to the command value "T*" a filter that takes into account a delay in the control system.

As discussed above, the rotary electric machine control device according to the present disclosure includes the high speed range-position computation section 3 and the low speed range-position computation section 5, and can estimate the magnetic pole position θ ($\hat{\theta}$) in a rotational speed range that suits each of the computation sections. In the switching section 1, the low speed rotation range RL and the high speed rotation range RH are set, and such rotation ranges are not only set simply in correspondence with the rotational speed, but also set in correspondence with the torque. This is particularly useful in the case where the high speed range-position computation section 3 is constructed utilizing an extended induced voltage model and the low speed range-position computation section 5 is constructed utilizing a high-frequency response that utilizes the magnetic saliency as in the embodiment. The technical significance will be described below.

As discussed above with an indication of the expressions (1) to (3), an extended induced voltage model includes an induced voltage generated by rotation of magnetic flux generated in the rotor by a d-axis current. In the case where the rotary electric machine 30 is controlled so as to maximize output torque (in the case where maximum torque control is performed), a d-axis current also flows through the stator, which increases an induced voltage for estimating the magnetic pole position. That is, when the high speed range-position computation section 3 estimates the magnetic pole position, the estimation accuracy is improved to stabilize computation in the case of high torque (in the case where the torque is large) compared to the case of low torque (the case where the torque is small).

When the low speed range-position computation section 5 estimates the magnetic pole position θ ($\hat{\theta}$), on the other hand, the estimation accuracy is improved to stabilize computation in the case of low torque (in the case where the torque is small) compared to the case of high torque (the case where the torque is large) for the following reasons. In the case where the maximum torque control is performed, the d-axis current generally has a negative value, and thus the d-axis dynamic inductance "$Ld_h$" is hardly varied irrespective of the magnitude of the torque. On the other hand, when the torque becomes larger, the q-axis current is increased so that q-axis magnetic flux gradually approaches a saturated region. The dynamic inductance is a differential value of magnetic flux. Thus, when the q-axis current is increased to approach a saturated region, the q-axis dynamic inductance "$Lq_h$" approximates "0". That is, as the torque becomes larger, the q-axis dynamic inductance "$Lq_h$" becomes smaller.

The method of estimating the magnetic pole position using a component as a response to a high-frequency observation signal utilizes the magnetic saliency of the rotary electric machine. As discussed above, the salient pole ratio is "$Lq_h/Ld_h$". When the q-axis dynamic inductance "$Lq_h$" becomes smaller, the salient pole ratio becomes lower, which reduces the stability in estimating the magnetic pole position utilizing the saliency. As discussed above, the salient pole ratio must be more than "1" in order to estimate the magnetic pole position. Thus, the stability in computation is reduced when the torque is increased to reduce the q-axis dynamic inductance "$Lq_h$" even at the same rotational speed.

In the switching section 1, as discussed above, the low speed rotation range RL and the high speed rotation range RH are set, and such rotation ranges are not only set simply in correspondence with the rotational speed, but also set in correspondence with the torque. Specifically, estimation of the magnetic pole position by the high speed range-position computation section 3 is executed with a region in which the rotational speed is high and the torque is high defined as the application region, and estimation of the magnetic pole position by the low speed range-position computation section 5 is executed with a region in which the rotational speed is low and the torque is low defined as the application region. As a result, the switching section 1 sets a region in which each of the two computation sections (3, 5) can stably estimate the magnetic pole position, which enables the magnetic pole position to be estimated with high accuracy.

Estimation of the magnetic pole position by the high speed range-position computation section 3 is performed more preferably when the torque of the rotary electric machine 30 is higher as discussed above. However, such estimation can be performed even in the case where such torque is low. On the other hand, estimation of the magnetic pole position by the low speed range-position computation section 5 may not be performed with the salient pole ratio falling below "1" in the case where such torque is high. Thus, estimation of the magnetic pole position by the high speed range-position computation section 3 may be executed with all the region in which the rotational speed is high defined as the application region irrespective of the torque, and estimation of the magnetic pole position by the low speed range-position computation section 5 may be executed with a region in which the rotational speed is low and the torque is low defined as the application region. That is, estimation of the magnetic pole position by the high speed range-position computation section 3 may be executed with a region in which the rotational speed is high and the torque is both low and high and a region in which the rotational speed is low and the torque is high defined as the application region, and estimation of the magnetic pole position by the low speed range-position computation section 5 may be executed with a region in which the rotational speed is low and the torque is low defined as the application region.

When the low speed range-position computation section 5 estimates the magnetic pole position θ (θ^), it is necessary to superimpose a high-frequency observation command on the voltage command Vd*. To this end, when the low speed range-position computation section 5 executes computation, the switching section 1 switches the switch 2 to superimpose a high-frequency observation command on the voltage command Vd*. When the low speed range-position computation section 5 does not execute computation, the switching section 1 switches the switch 2 to set a signal to be superimposed on the voltage command Vd* to "0".

In the boundary computation mode executed in the boundary region RB, as discussed above, the rotational speed ω (ω^) and the magnetic pole position θ (θ^) are preferably calculated in accordance with a weighted average of the result ($ω^{\wedge}_L$ and $θ^{\wedge}_L$) of computation by the low speed range-position computation section 5 and the result ($ω^{\wedge}_H$ and $θ^{\wedge}_H$) of computation by the high speed range-position computation section 3 calculated in accordance with the rotational speed. The weighted average is preferably obtained by the switching section 1. The specific method of obtaining a weighted average is disclosed in JP H10-94298 A etc. and known in the art, and thus not described in detail.

In the above description, the low speed range-position computation section 5 superimposes an observation signal on a voltage command. However, the configuration of the low speed range-position computation section 5 is not limited thereto. It is possible to apply a variety of aspects in which a high-frequency observation signal is applied to the rotary electric machine, and in which the magnetic pole position is estimated in accordance with a response from the rotary electric machine. For example, an observation signal may be superimposed on a current command.

INDUSTRIAL APPLICABILITY

The present disclosure may be utilized for a rotary electric machine control device that performs vector control on a rotary electric machine.

The invention claimed is:

1. A rotary electric machine control device that controls a rotary electric machine that includes a rotor in which a permanent magnet is disposed so as to provide magnetic saliency, and that performs feedback control on the rotary electric machine on the basis of a deviation between a current command and a feedback current from the rotary electric machine in a d-q-axis vector coordinate system defined by a d-axis which extends in a direction of a magnetic field produced by the permanent magnet and a q-axis which is orthogonal to the d-axis, the rotary electric machine control device comprising:
an electronic control unit that is structured to:
compute a magnetic pole position of the rotor on the basis of an induced voltage generated in the rotary electric machine;
apply a high-frequency observation signal to the rotary electric machine, and compute the magnetic pole position of the rotor on the basis of a high-frequency component included in the feedback current as a component as a response to the observation signal; and
switch a computation mode for computing the magnetic pole position of the rotor between at least two modes that include a high speed range computation mode in which the magnetic pole position is computed and a low speed range computation mode in which the magnetic pole position is computed, wherein
the electronic control unit sets a high speed rotation range prescribed by a rotational speed and torque of the rotary electric machine and a low speed rotation range prescribed by the rotational speed and the torque of the rotary electric machine and prescribed on a side on which the rotational speed is lower than that in the high speed rotation range, applies the high speed range computation mode in the high speed rotation range, applies the low speed range computation mode in the low speed rotation range, and sets both a high speed range-side boundary and a low speed range-side boundary so as to be on a side on which the rotational speed is low in the case where the torque is relatively high compared to a case where the torque is relatively low, the high speed range-side boundary being a boundary between a region on a side on which the rotational speed is lower than that in the high speed rotation range and the high speed rotation range, and the low speed range-side boundary being a boundary between a region on a side on which the rotational speed is higher than that in the low speed rotation range and the low speed rotation range.

2. The rotary electric machine control device according to claim 1, wherein
the electronic control unit computes the magnetic pole position of the rotor at least on the basis of an induced voltage generated in a stator by rotation of the rotor.

3. The rotary electric machine control device according to claim 1, wherein
the electronic control unit computes the magnetic pole position of the rotor using an extended induced voltage model that uses an extended induced voltage calculated from an induced voltage generated by rotation of magnetic flux generated in the rotor by a d-axis current, an induced voltage generated by variations in current that flows through a q-axis inductance on the stator side, and an induced voltage generated by rotation of magnetic flux of the permanent magnet.

4. The rotary electric machine control device according to claim 1, wherein:
the electronic control unit computes a rotational speed of the rotor;
a hysteresis that is larger than an error in the rotational speed produced by an error in the magnetic pole position computed in the high speed range computation mode is set for the high speed range-side boundary; and
a hysteresis that is larger than an error in the rotational speed produced by an error in the magnetic pole position computed in the low speed range computation mode is set for the low speed range-side boundary.

5. The rotary electric machine control device according to claim 1, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

6. The rotary electric machine control device according to claim 2, wherein
the electronic control unit computes the magnetic pole position of the rotor using an extended induced voltage model that uses an extended induced voltage calculated from an induced voltage generated by rotation of magnetic flux generated in the rotor by a d-axis current, an induced voltage generated by variations in current that flows through a q-axis inductance on the stator side, and an induced voltage generated by rotation of magnetic flux of the permanent magnet.

7. The rotary electric machine control device according to claim 2, wherein:
the electronic control unit computes a rotational speed of the rotor;
a hysteresis that is larger than an error in the rotational speed produced by an error in the magnetic pole position computed in the high speed range computation mode is set for the high speed range-side boundary; and
a hysteresis that is larger than an error in the rotational speed produced by an error in the magnetic pole position computed in the low speed range computation mode is set for the low speed range-side boundary.

8. The rotary electric machine control device according to claim 2, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

9. The rotary electric machine control device according to claim 3, wherein:
the electronic control unit computes a rotational speed of the rotor;
a hysteresis that is larger than an error in the rotational speed produced by an error in the magnetic pole position computed in the high speed range computation mode is set for the high speed range-side boundary; and
a hysteresis that is larger than an error in the rotational speed produced by an error in the magnetic pole position computed in the low speed range computation mode is set for the low speed range-side boundary.

10. The rotary electric machine control device according to claim 3, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

11. The rotary electric machine control device according to claim 6, wherein:
the electronic control unit computes a rotational speed of the rotor;
a hysteresis that is larger than an error in the rotational speed produced by an error in the magnetic pole position computed in the high speed range computation mode is set for the high speed range-side boundary; and
a hysteresis that is larger than an error in the rotational speed produced by an error in the magnetic pole position computed in the low speed range computation mode is set for the low speed range-side boundary.

12. The rotary electric machine control device according to claim 6, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

13. The rotary electric machine control device according to claim 4, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

14. The rotary electric machine control device according to claim 7, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

15. The rotary electric machine control device according to claim 9, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

16. The rotary electric machine control device according to claim 11, wherein
a high-frequency application region in which the observation signal is applied to the rotary electric machine while executing the computation mode applied in a region on a side on which the rotational speed is higher than that in the low speed rotation range is set adjacent to the low speed range-side boundary on a side on which the rotational speed is higher than that in the low speed range-side boundary.

* * * * *